United States Patent
Faris et al.

(10) Patent No.: US 6,798,639 B2
(45) Date of Patent: Sep. 28, 2004

(54) FLUID DEIONIZATION FLOW THROUGH CAPACITOR SYSTEMS

(75) Inventors: Sadeg M. Faris, Pleasantville, NY (US); Xuerong Gao, White Plains, NY (US)

(73) Assignee: InventOjaya Sdn. Bhd., Cyberjaya (ML)

( * ) Notice: Subject to any disclaimer, the term of this patent is extended or adjusted under 35 U.S.C. 154(b) by 0 days.

(21) Appl. No.: 10/648,033

(22) Filed: Aug. 26, 2003

(65) Prior Publication Data

US 2004/0095706 A1 May 20, 2004

Related U.S. Application Data

(63) Continuation-in-part of application No. 10/213,523, filed on Aug. 7, 2002.
(60) Provisional application No. 60/406,014, filed on Aug. 26, 2002.

(51) Int. Cl.$^7$ ................................................. H01G 4/35
(52) U.S. Cl. ..................... 361/302; 361/303; 361/321.4; 361/512

(56) References Cited

U.S. PATENT DOCUMENTS 5,192,432 A * 3/1993 Andelman .................. 204/665
6,462,935 B1 * 10/2002 Shiue et al. ................ 361/511

* cited by examiner

*Primary Examiner*—Anthony Dinkins
(74) *Attorney, Agent, or Firm*—Ralph J. Crispino

(57) ABSTRACT

Flow through capacitors are described herein having improved capabilities. In general, asymmetric flow through capacitors are formed, increasing overall capacitance. The asymmetry may be accomplished by utilizing electrodes of different materials, different dimensions, or the same materials with different capacitance properties.

27 Claims, 4 Drawing Sheets

FLUID DEIONIZATION FLOW THROUGH CAPACITOR SYSTEMS

RELATED APPLICATIONS

The present application claims priority to U.S. Provisional Patent Application No. 60/406,014 filed Aug. 26, 2002 entitled "Fluid Desalinization Flow Through Capacitor Systems", and is a Continuation in Part of U.S. patent application Ser. No. 10/213,523 entitled "Movable Electrode Flow-Through Capacitor" by Sadeg M. Faris filed on Aug. 7, 2002, which are both incorporated by reference herein in their entireties.

BACKGROUND OF THE INVENTION

1. Field of the Invention

The present invention relates to fluid deionization flow through capacitor systems, including systems having enhanced capacitance properties.

2. Description of the Prior Art

Flow through capacitors have been developed to separate materials from fluid streams, such as salt from water. For example, Andleman U.S. Pat. Nos. 5,192,432, 5,186,115, 5,200,068, 5,360,540, 5,415,768, 5,547,581, 5,620,597, 5,415,768, and U.S. Pat. No. 5,538,611 to Toshiro Otowa describe flow through capacitor systems which filters polluted and brackish water between alternating electrodes of activated carbon (the capacitors). When voltage is applied, salts, nitrates, totally dissolved solids and other adulterants in the water are attracted to the high surface area carbon material. Ions are adsorbed on the electrodes, and thus the process must be stopped to desorb the contaminants as concentrated liquid. This is accomplished by short-circuiting of the electrodes.

This method has been taught as a better process for water desalinization than traditional systems like reverse osmosis, which passes through contaminants such as nitrates, promotes bacterial growth and wastes one or more gallons of water for every one it purifies. Further, ion exchange systems, also widely used, generate pollution and use strong acids, bases and salts to regenerate the resin.

Deionized water is employed in many commercial applications, such as semiconductor and chrome-plating plants, automobile factories, beverage production, and steel processing. Further, systems are contemplated in homes units, businesses, manufacturing and municipal facilities, and other applications that can recycle their water output, cutting costs and protecting the environment.

Of course, a prime objective flow through capacitor technology entails the desalinization of sea water at a reasonable cost, providing an inexhaustible supply of usable water to regions in need. Presently, advanced research is underway using new materials including carbon nanotubes. However, nanotechnology has yet to become an affordable and fully understood area.

Nonetheless, the water demands of the Third World are immediate. Two-thirds of the world population do not have access to clean water. Most disease in the developing world is water-related—more than 5 million people a year die of easily preventable waterborne diseases such as diarrhea, dysentery and cholera.

Plainly stated, potable water will be the most valuable commodity in the future. The world's population will double in the 50 to 90 years. Per capita water consumption increases while the supply deteriorates. 80% of the world's population lives within 200 miles of a coastline where water is available but not potable or suitable for agriculture. 70% of the ground water is brackish. 85% of all illness is associated with unsafe drinking water.

Therefore, it is needed in the world a low cost, safe, and efficient system and process to desalinate water, or to remove other substances from a material, as is needed.

SUMMARY OF THE INVENTION

The above-discussed and other problems and deficiencies of the prior art are overcome or alleviated by the several methods and apparatus of the present invention for removing ionic substances from fluids, such as removing salt from water.

Flow through capacitors are described herein having improved capabilities. In general, asymmetric flow through capacitors are formed, increasing overall capacitance. The asymmetry may be accomplished by utilizing electrodes of different materials, different dimensions, or the same materials with different capacitance properties.

The above-discussed and other features and advantages of the present invention will be appreciated and understood by those skilled in the art from the following detailed description and drawings.

DETAILED DESCRIPTION OF THE ILLUSTRATIVE EMBODIMENTS

Figure 1:
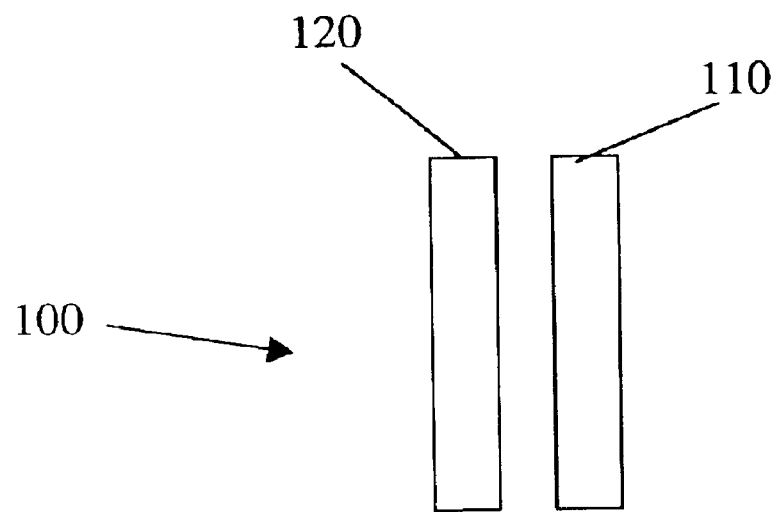
FIG. 1 is a schematic representation of a conventional flow through capacitor.

Referring now to FIG. 1, an exemplary conventional symmetrical flow-through capacitor 100 is depicted having a positive electrode 110 and having a capacitance value C+, and a negative electrode 120 having a capacitance value C−. The overall capacitance C(Total) for a flow-through capacitor 100 is defined by Equation 1.

$$1/C_T = (1/C+) + (1/C-) \qquad \text{Equation 1}$$

In conventional flow through capacitors, the electrodes 110, 120 are generally the same, therefore the capacitance thereof is the same value C. Therefore, applying Equation 1, $1/C_T = (1/C) + (1/C) = 2/C$; and the overall capacitance $C_T = \frac{1}{2}C$.

Although only one pair of electrodes are shown in the example of FIG. 1 and in other embodiments herein (FIG. 2), generally plural sets of electrodes are used. Each set of electrodes includes a space therebetween for fluid flow. Upon application of a voltage (e.g., from a DC source, and contacting the electrodes via suitable contacts) and passage of an ionic fluid, ions of appropriate charge are attracted to the electrodes, forming an electric double layer. As is known in the art, shorting of the electrodes reverses the process, removing the attracted ions from the electrodes.

Figure 2:
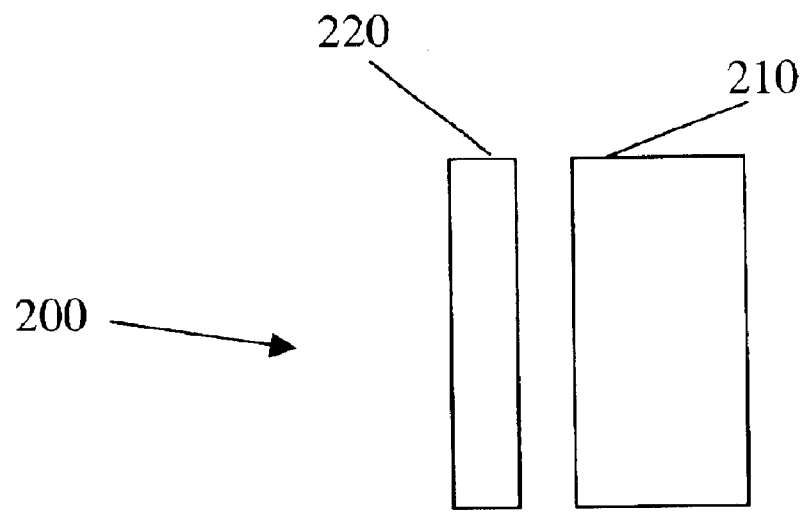
FIG. 2 is a schematic representation of an asymmetric flow through capacitor according to the present invention.

Referring now to FIG. 2, a schematic of an asymmetrical flow-through capacitor 200 according to the present invention is depicted. The flow-through capacitor 200 includes a positive electrode 210 having a capacitance value C+' and a negative electrode 220 having a capacitance value C− (i.e., the same capacities as electrode 120). If the value of C+ is sufficiently increased, the expression 1/C+ in equation one approaches zero, and thus the overall capacitance $C_T$' can be expressed in Equation 2.

$$C+' \gg C+ 1/C_T' \approx 1/C- C_T' \approx C- \approx 2C_T \qquad \text{Equation 2}$$

The capacitance value $C_T$ may be sufficiently increased by using an assymetrical configuration, wherein one electrode has a much higher capacitance than the other. Thus, as can be seen from Equation 2, the overall capacitance $C_T$' is approximately double that of the symmetrical cell with the same capacitance values for the negative electrode. One of skill in the art will appreciate that although the example herein describes the increase capacitance at the positive electrode, the same overall capacitance increase will result from a system whereby the capacitance of the negative electrode is substantially greater than that of the positive electrode.

It should be appreciated that the relative values of the negative and positive electrodes may be such that the capacitance of one is at least double that of the other. The term "substantially greater" as used herein is defined, therefore, as being at least double the value.

In general, the ionic capacitance of each electrode is determined by the characteristics of the electrode. These characteristics may include the effective surface area of the electrode, the materials of construction of the electrode, or a combination of at least one of the foregoing characteristics.

The effective surface area may be increase by increasing porosity of one of the electrode relative to the other, using higher surface area materials to construct one of the electrode, or other physical characteristics.

The material interaction with the ions may increase the capacitance based on the materials of construction of the electrodes.

In one preferred embodiment, the flow through capacitor 200 is used in water desalinization. In this embodiment, the negative electrode 220 attracts positive sodium ions, and the positive electrode 210 attracts negative chlorine ions.

In one embodiment of a water desalinization flow through capacitor, both the negative and positive electrodes 220, 210 are formed of the same materials. Asymmetry is attained by increasing the volume of one of the electrodes such that the capacitance of the increased electrode substantially increases. In this embodiment, the electrodes may comprise, for example, high surface area carbon or other suitable materials as described further herein.

In another embodiment of a water desalinization flow through capacitor, both the negative and positive electrodes 220, 210 are formed of the same materials. Asymmetry is attained by increasing the surface area of one of the electrodes such that the capacitance of the increased electrode substantially increases. In this embodiment, the electrodes may comprise, for example, high surface area carbon or other suitable materials as described further herein, whereby the surface area of one electrode is sufficiently greater that the surface area of the other electrode such that the capacitance of the higher surface area electrode is sufficiently greater than the other electrode to achieve the desired asymmetry. The surface area may be increased, for example, by using an electrode having higher specific surface areas as compared to another. Specific surface area may be increased by using materials inherently having higher levels of surface area per unit mass (e.g., high surface area activated carbon for one electrode as compared to graphite or low surface area carbon for the opposite electrode). In anther embodiment, specific surface area may be increased by forming one electrode with higher porosity as compared to the other. Further, specific surface area may be increased by choice of substrate for the electrodes.

In still another embodiment of a water desalinization flow through capacitor, both the negative and positive electrodes 220, 210 are formed of different materials. Asymmetry is attained by the inherent capacitance differences in these different materials. In this embodiment, the negative electrode may comprise, for example, high surface area carbon or other suitable materials as described further herein, and the positive electrode comprises a chlorine evolving electrode, as described further herein. Of course, for systems other than desalination systems, other suitable gas evolving electrodes may be employed. Since the chlorine evolving electrode generally does not adsorb ions, the capacitance is effectively unlimited, thereby attaining the asymmetry. Note that this embodiment may be characterized as a hybrid system, whereby the sodium ions are adsorbed on the negative high surface area electrode and subsequently desorbed, and the chlorine ions undergo electrochemical reaction at the chlorine evolving electrode to form chlorine gas, which may be captured for subsequent use, evolved in air, dissolved in the water, or a combination thereof.

A high surface area conductive constituent alone may be formed as certain electrodes herein, or may be supported on appropriate substrates (conductive or non-conductive, depending on the form of the electrodes). Alternatively, a current collector and a high surface area conductive constituent may be in the form of layers, or may be a single layer, for example, as described in an exemplary air cathode is disclosed in U.S. Pat. No. 6,368,751, entitled "Electrochemical Electrode For Fuel Cell", to Wayne Yao and Tsepin Tsai, filed on Oct. 8, 1999, which is incorporated herein by reference in its entirety.

The high surface area conductive material employed in the flow-through capacitor may comprise a wide variety of electrically conductive materials, including, but not limited to, graphite, activated carbon particles, activated carbon fibers, activated carbon particles formed integrally with a binder material, woven activated carbon fibrous sheets, woven activated carbon fibrous cloths, non-woven activated carbon fibrous sheets, non-woven activated carbon fibrous cloths; compressed activated carbon particles, compressed activated carbon particles fibers; azite, metal electrically conductive particles, metal electrically conductive fibers, acetylene black, noble metals, noble metal plated materials, fullerenes, conductive ceramics, conductive polymers, or any combination comprising at least one of the foregoing. The high surface area material may optionally include coatings or plating treatments with a conductive material, such as palladium, platinum series black, to enhance electrical conductivity. The high surface area material may also be treated with chemicals such as alkali, e.g., potassium hydroxide, or a halogen, e.g., fluorine; to increase the surface area and conductivity. Activated carbon material of greater than about 1000 square meters per gram surface area are preferred, but it is understood that lower surface area materials may also be employed, depending on factors including but not limited to the distance between the electrodes, the voltage applied, the desired degree of ion removal, the speed of the movable cathodes, and the configuration of the movable cathodes.

In embodiments of water desalinization flow through capacitors using different electrodes, the chlorine evolving electrode may comprise any suitable chlorine evolving electrode, in the form of a plate, mesh, grid, sponge, or the like. The materials for the chlorine evolving electrode may be graphite or a dimensionally stable anode (DSA), as is known in the art of chlor/alkali manufacturing. Suitable DSAs include titanium, zirconium, hafnium, niobium or mixtures thereof, having an active surface layer of ruthenium, iridium, platinum, palladium or mixtures thereof. Further, even an electrode formed of a high surface area material as described above may function as a chlorine evolving electrode when the potential between the electrodes is sufficiently high. The value of this potential varies with factors including, but not limited to, the maximum applied voltage to either of the electrodes, the fluid concentration, and the internal resistance of the cell.

A separator may optionally be provided between the electrodes, as is known in the art. The separator may be adhered to either or both electrodes, as in known in the electrochemical cell art. That is, the separator may be laminated on the electrodes. Alternatively, a separator or ion exchange membrane may be polymerized in situ on one or more surface of an electrode. Further, the separator, e.g., an ion exchange membrane, may be positioned between the electrodes (e.g., with suitable support structures), as is known in the art of chlor/alkali manufacturing.

The separator may function to prevent undesired electrical contact between opposite electrodes, and optionally to provide structure integrity at the electrode surface. Further, the separator may be used to enhance entrapment of the ions that have been adsorbed by the electrodes and/or gases that have evolved from the electrodes. For example, in embodiments where the asymmetrical flow through capacitor is used for water desalinization, absorption of the chlorine gas evolving at the positive electrode may be prevented. Additionally, the separator may be used to prevent re-introduction of evolved gases into the system, especially on the opposing electrode. That is, gases (e.g., chlorine in the case of water desalinization) evolved at the positive electrode are prevented from being adsorbed on the negative electrode.

The separator may be any commercially available separator capable of electrically isolating the electrodes, while allowing sufficient ionic transport therebetween. Suitable separators are provided in forms including, but not limited to, woven, non-woven, porous (such as microporous or nanoporous), cellular, polymer sheets, and the like. Materials for the separator include, but are not limited to, nylon, polyolefin (e.g., Gelgard® commercially available from Dow Chemical Company), polyvinyl alcohol (PVA), cellulose (e.g., nitrocellulose, cellulose acetate, and the like), polyethylene, polyamide (e.g., nylon), fluorocarbon-type resins (e.g., the Nafion® family of resins which have sulfonic acid group functionality, commercially available from du Pont), cellophane, filter paper, and combinations comprising at least one of the foregoing materials. The separator may also comprise additives and/or coatings such as acrylic compounds and the like to make them more wettable and permeable to the electrolyte.

Alternatively, the separator may also provide ionic conductivity, for example in the form of a solid-state membrane. Suitable membranes are described in commonly assigned: U.S. Pat. No. 6,183,914, entitled "Polymer-based Hydroxide Conducting Membranes", to Wayne Yao, Tsepin Tsai, Yuen-Ming Chang, and Muguo Chen, filed on Sep. 17, 1998; U.S. patent application Ser. No. 09/259,068, entitled "Solid Gel Membrane", by Muguo Chen, Tsepin Tsai, Wayne Yao, Yuen-Ming Chang, Lin-Feng Li, and Tom Karen, filed on Feb. 26, 1999; U.S. Pat. No. 6,358,651 entitled "Solid Gel Membrane Separator in Rechargeable Electrochemical Cells", by Muguo Chen, Tsepin Tsai and Lin-Feng Li, filed Jan. 11, 2000; U.S. Ser. No. 09/943,053 entitled "Polymer Matrix Material", by Robert Callahan, Mark Stevens and Muguo Chen, filed on Aug. 30, 2001; and U.S. Ser. No. 09/942,887 entitled "Electrochemical Cell Incorporating Ploymer Matrix Material", by Robert Callahan, Mark Stevens and Muguo Chen, filed on Aug. 30, 2001; all of which are incorporated by reference herein in their entireties.

Figure 3:
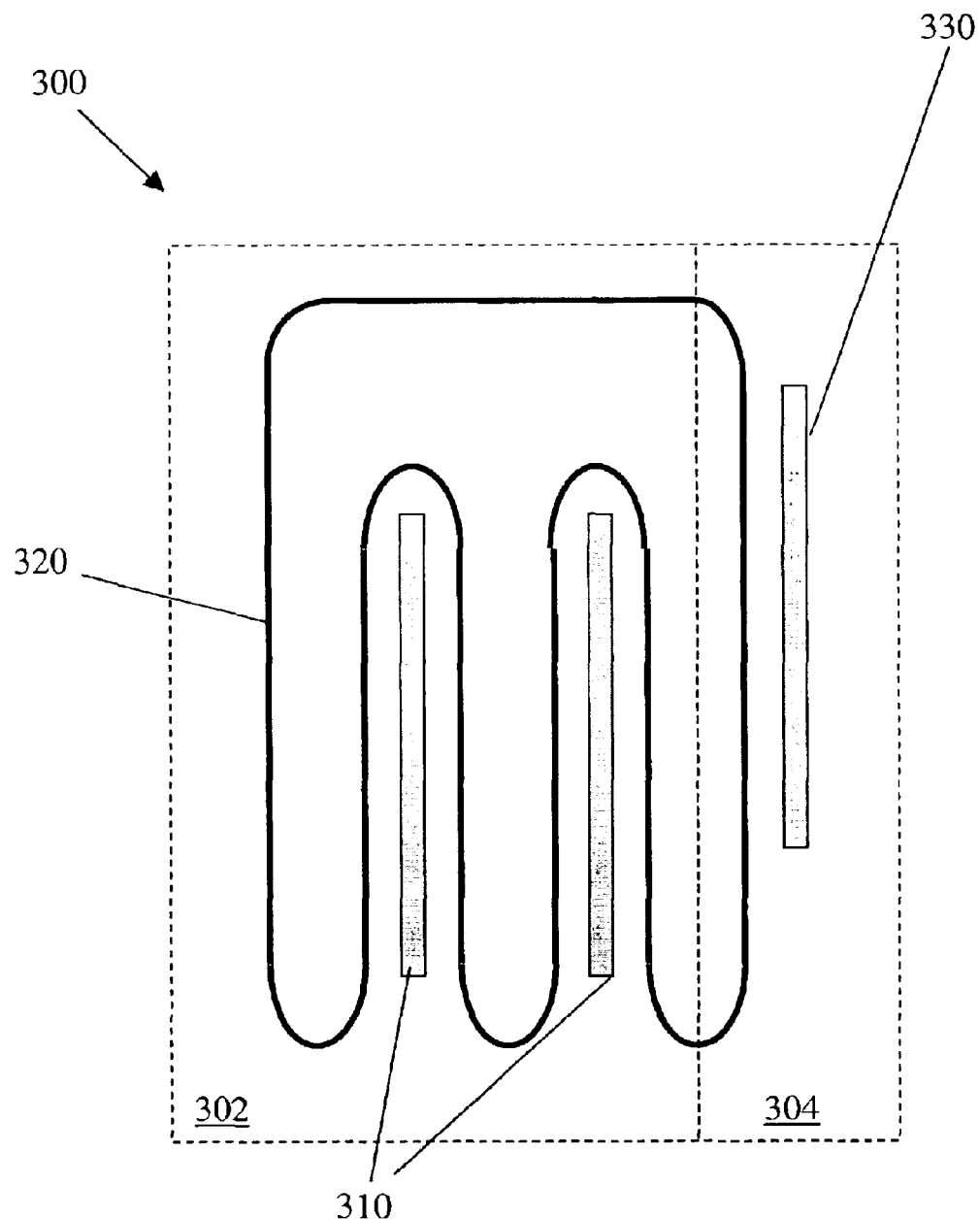
FIG. 3 is a schematic representation of still another asymmetric flow through capacitor according to the present invention having a negative electrode in the form of a belt structure that meanders through a first set of positive electrodes for fluid deionization and a second positive electrode for ion recovery.

Referring now to FIG. 3, another asymmetrical flow-through capacitor 300 is depicted. Flow-through capacitor 300 includes a movable negative electrode 320, e.g., in the form of a belt structure. Systems with movable electrodes are described, e.g., in aforementioned patent application Ser. No. 10/213,523 entitled "Movable Electrode Flow-Through Capacitor" by Faris filed on Aug. 7, 2002, which is incorporated by reference herein in its entirety. As will be apparent to one skilled in the art, suitable roller structures and other mechanical and/or electromechanical structures may be employed to allow the belt electrode 320 to traverse. Positive electrodes 310 are provided in the meandering path of the belt electrode 320. As shown, flow through capacitor 300 includes a desalination sub-system 302, and an electrode regeneration sub-system 304 (for removing adsorbed ions from the belt electrode 320. The regeneration sub-system 304 includes any suitable electrode 330 for desorbing the ions from the belt electrode 320, such as an air diffusion electrode. Alternatively, the electrode regeneration sub-system 304 may comprise suitable configurations for shorting the negative belt electrode 320 to allow for desorbing the ions as is known in the art.

Figure 4:
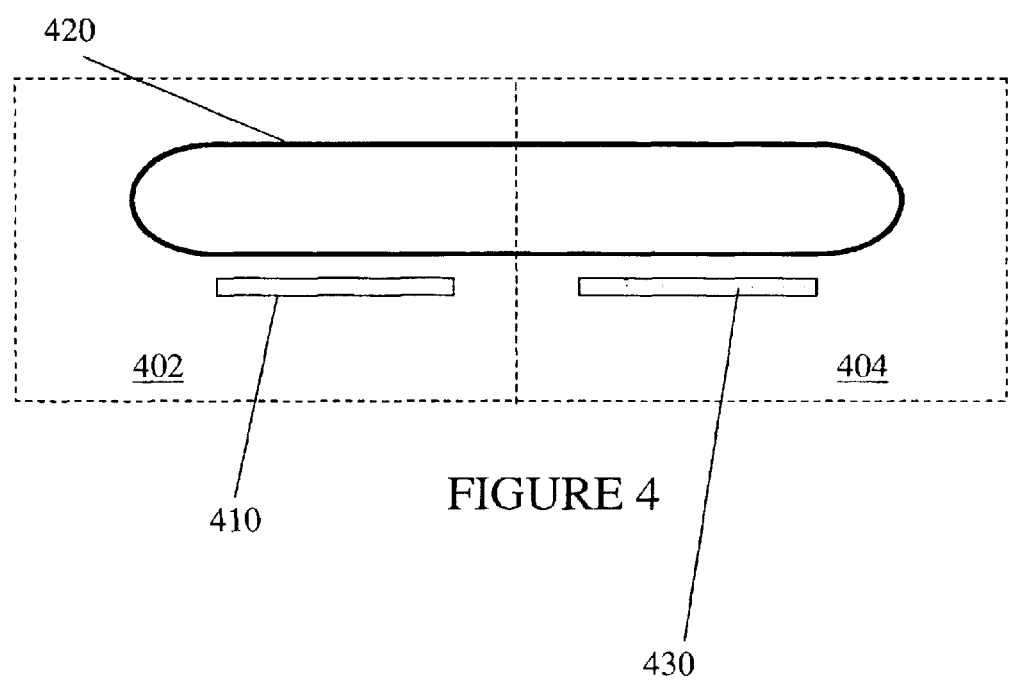
FIG. 4 is a schematic representation of still another asymmetric flow through capacitor according to the present invention having a negative electrode in the form of a belt structure that traverses across a positive electrodes for fluid deionization and a second positive electrode for ion recovery.

Referring now to FIG. 4, another asymmetrical flow-through capacitor 300 is depicted. Flow-through capacitor 400 includes a movable negative electrode 420, e.g., in the form of a belt structure. As will be apparent to one skilled in the art, suitable roller structures and other mechanical and/or electromechanical structures may be employed to allow the belt electrode 420 to traverse. A positive electrode 410 is provided in ionic communication with the belt electrode 420. As shown, flow through capacitor 400 includes a desalination sub-system 402, and an electrode regeneration sub-system 404 (for removing adsorbed ions from the belt electrode 420. The regeneration sub-system 404 includes any suitable electrode 430 for desorbing the ions from the belt electrode 420, such as an air diffusion electrode. Alternatively, the electrode regeneration sub-system 404 may comprise suitable configurations for shorting the negative belt electrode 420 to allow for desorbing the ions as is known in the art.

In the configurations of FIGS. 3 and 4, asymmetry is provided by at least three different mechanisms. In one instance, the materials and surface areas of the electrodes may be similar. In another instance, the materials of the electrodes may be similar, but the surface area of the electrodes may be different. Since the belt electrode 320/420 has a greater capacitance than the stationary electrode 310/410 due to the fact that traversing allows increased capacitance, asymmetry is attained.

In still another instance, the materials of the electrodes may be different, e.g., the belt electrode 320/420 comprising high surface area materials such as carbon for adsorption, and the stationary electrodes 310/410 comprising chlorine evolving electrodes. In these embodiments, strict adherence to the above mentioned Equation 2 may not result in a capacitance of one electrode that is substantially greater than that of the other electrode. This is due to the flowing. As mentioned above, the chlorine evolving electrodes essentially have unlimited capacitance. Further, the movable electrodes, especially in configurations wherein regeneration of the electrodes occurs essentially simultaneously with adsorption, the capacitance also approaches an unlimited value. Nonetheless, overall system benefits are achieved due to the ability to remove quantitatively more ions that either systems using stationary electrodes with a chlorine evolving electrodes, or systems using movable electrodes with an opposing electrode of limited capacitance.

Figure 5:
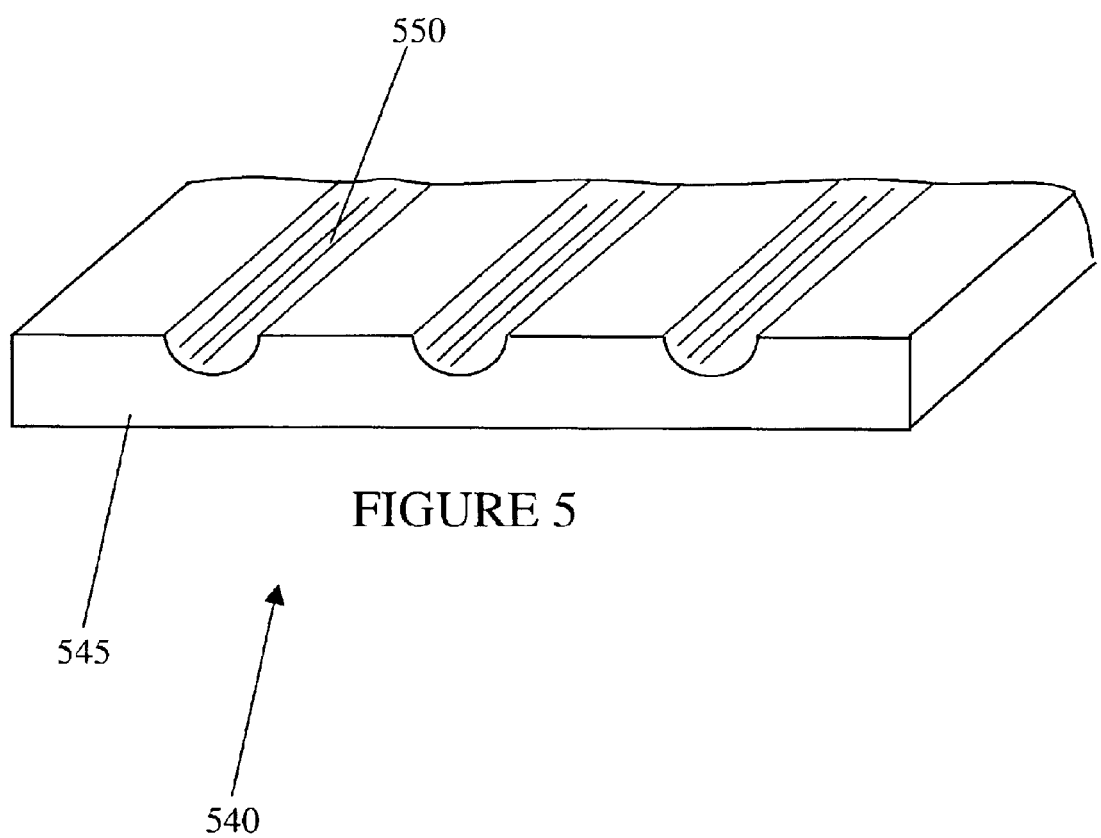
FIG. 5 is an isometric view of an electrode for a flow through capacitor including channels.

Referring now to FIG. 5, an exemplary electrode 540 having channels 550 therein is depicted. The electrode 540 and comprises a body portion 545, for example, formed of the same materials as described above for the electrodes. Further, an optional separator may be laminated or otherwise integrally formed with the body portion 545 of the electrode. A plurality of channels 550 are formed in the body 545. Note that although the channels are depicted as generally having a U-shaped cross-section, other shapes may be used, including V-shaped, rectangular, or any combination of shapes.

When electrodes similar to electrode 540 are used in a flow through capacitor, fluid throughput may be substantially increased. Note that the spacing between channels 545 may be decreased to increase the overall throughput. The energy density of the capacitors must be balanced with the throughput for optimized performance (maximize charge storage with ease of flow throughput to increase the charge storage rate).

Both electrodes in a cell may have channels as shown in FIG. 5. These electrodes may be registered such that the channels are aligned or offset, and may be used in bipolar configurations or monopolar configurations, and in symmetrical or asymmetrical systems.

Further, the overall pressure within a cell having one or more electrodes 540 may be decreased, thereby simplifying any requisite support structures for electrochemical flow-through capacitor system having a plurality of such cells. Also, the overall surface area of electrode is the increased by including a plurality of channels 545.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A flow-through capacitor comprising a positive electrode having a capacitance value C+, and a negative electrode having a capacitance value C−, wherein the overall capacitance $C_T$ is defined by:

$$1/C_T = (1/C+) + (1/C-),$$

further wherein the value of C+ and C− differ sufficiently to form an asymmetrical capacitor.

2. The flow-through capacitor as in claim 1, wherein the positive electrode and the negative electrode comprise similar materials.

3. The flow-through capacitor as in claim 2, wherein the positive electrode and the negative electrode comprise high surface area conductive constituents.

4. The flow-through capacitor as in claim 3, wherein the high surface area conductive constituents are supported on substrates.

5. The flow-through capacitor as in claim 4, wherein the substrate is electrically conductive.

6. The flow-through capacitor as in claim 4, wherein the substrate is electrically non-conductive.

7. The flow-through capacitor as in claim 6, wherein the high surface area conductive constituents are impregnated in rigid sponge substrates.

8. The flow-through capacitor as in claim 5, wherein the high surface area conductive constituents are impregnated in rigid sponge substrates.

9. The flow-through capacitor as in claim 3, wherein the high surface area conductive constituents are selected from the group of materials consisting of graphite, activated carbon particles, activated carbon fibers, activated carbon particles formed integrally with a binder material, woven activated carbon fibrous sheets, woven activated carbon fibrous cloths, non-woven activated carbon fibrous sheets, non-woven activated carbon fibrous cloths; compressed activated carbon particles, compressed activated carbon particles fibers; azite, metal electrically conductive particles, metal electrically conductive fibers, acetylene black, noble metals, noble metal plated materials, fullerenes, conductive ceramics, conductive polymers, or any combination comprising at least one of the foregoing materials.

10. A flow-through capacitor as in claim 1, wherein the positive electrode and the negative electrode comprise different materials.

11. The flow-through capacitor as in claim 10, wherein the positive electrode or the negative electrode comprise high surface area conductive constituents.

12. The flow-through capacitor as in claim 11, wherein the high surface area conductive constituents are supported on substrates.

13. The flow-through capacitor as in claim 12, wherein the substrate is electrically conductive.

14. The flow-through capacitor as in claim 12, wherein the substrate is electrically non-conductive.

15. The flow-through capacitor as in claim 14, wherein the high surface area conductive constituents are impregnated in rigid sponge substrates.

16. The flow-through capacitor as in claim 13, wherein the high surface area conductive constituents are impregnated in rigid sponge substrates.

17. The flow-through capacitor as in claim 11, wherein the high surface area conductive constituents are selected from the group of materials consisting of graphite, activated carbon particles, activated carbon fibers, activated carbon particles formed integrally with a binder material, woven activated carbon fibrous sheets, woven activated carbon fibrous cloths, non-woven activated carbon fibrous sheets, non-woven activated carbon fibrous cloths; compressed activated carbon particles, compressed activated carbon particles fibers; azite, metal electrically conductive particles, metal electrically conductive fibers, acetylene black, noble metals, noble metal plated materials, fullerenes, conductive ceramics, conductive polymers, or any combination comprising at least one of the foregoing materials.

18. The flow-through capacitor as in claim 11, wherein the opposing electrode is a gas evolving electrode.

19. The flow-through capacitor as in claim 11, wherein the opposing electrode is a chlorine evolving electrode.

20. The flow-through capacitor as in claim 11, wherein the opposing electrode is selected from the group of materials consisting of graphite or dimensionally stable anodes.

21. An asymmetrical flow through capacitor comprising positive electrode having a capacitance value C+ and a negative electrode having a capacitance value C−, wherein the capacitance value C+ is sufficiently large so that the expression 1/C+ approaches zero, wherein the overall capacitance $C_T$ is $$1/C_T \approx 1/C-.$$

22. An asymmetrical flow through capacitor comprising positive electrode having a capacitance value C+ and a negative electrode having a capacitance value C−, wherein the capacitance value C− is sufficiently large so that the expression 1/C− approaches zero, wherein the overall capacitance $C_T$ is $$1/C_T \approx 1/C+.$$

23. An electrode for a flow through capacitor, comprising channels therein for fluid flow.

24. An electrode-separator assembly, comprising an electrode including channels therein for fluid flow, and a separator laminated or otherwise integrally formed with the electrode.

25. A flow-through capacitor comprising a movable electrode and a gas evolving electrode.

26. The flow-through capacitor as in claim 25, wherein the movable electrode is a negative electrode for attracting sodium ions from a sodium chloride solution and the gas evolving electrode is a positive electrode for evolving chlorine gas.

27. The flow-through capacitor as in claim 25, wherein the capacitance of both electrodes is substantially unlimited.

* * * * *